United States Patent [19]

Harris

[11] Patent Number: 4,656,073
[45] Date of Patent: Apr. 7, 1987

[54] FABRICS MADE OF HOLLOW MONOFILAMENTS

[75] Inventor: Francis T. Harris, Millersville, Md.

[73] Assignee: Ametek, Inc., Odenton, Md.

[21] Appl. No.: 848,853

[22] Filed: Apr. 4, 1986

[51] Int. Cl.⁴ .............................................. B32B 3/02
[52] U.S. Cl. ........................................ 428/85; 428/95;
428/225; 428/229; 428/257; 428/255
[58] Field of Search ................ 428/85, 95, 90, 91,
428/255, 257, 397, 398, 225, 229, 400

[56] References Cited

U.S. PATENT DOCUMENTS

| | | | |
|---|---|---|---|
| 4,251,588 | 2/1981 | Goetemann et al. | 428/229 |
| 4,307,478 | 12/1981 | Ward et al. | 428/398 |
| 4,416,934 | 11/1983 | Himuro et al. | 428/398 |
| 4,522,873 | 6/1985 | Akagi et al. | 428/400 |
| 4,556,602 | 12/1985 | Williams | 428/95 |

*Primary Examiner*—James J. Bell
*Attorney, Agent, or Firm*—Browdy and Neimark

[57] ABSTRACT

Improved fabrics are produced by weaving and using relatively uniform elongated hollow monofilament bristles which partially collapse during weaving to form a partially flattened fabric without twists and bends and which has a superior weight/strength ratio in comparison with conventional fabrics.

11 Claims, 12 Drawing Figures

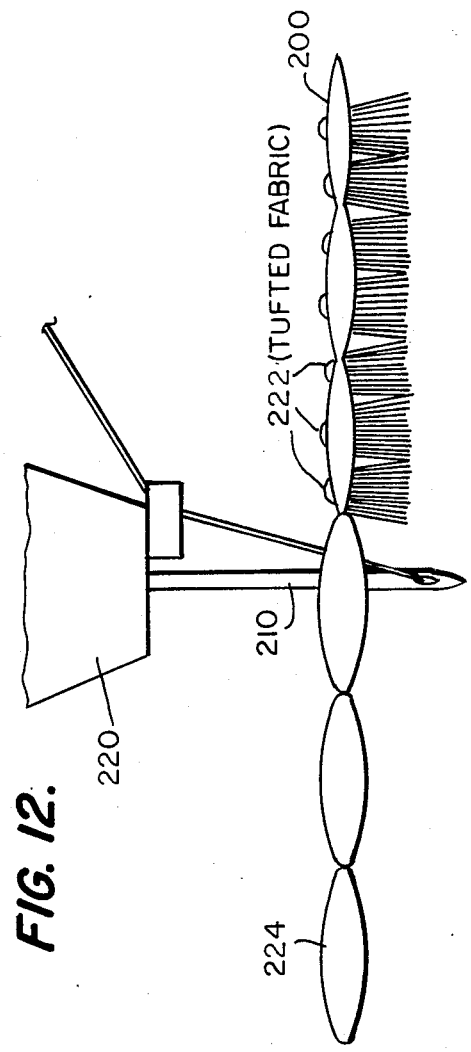
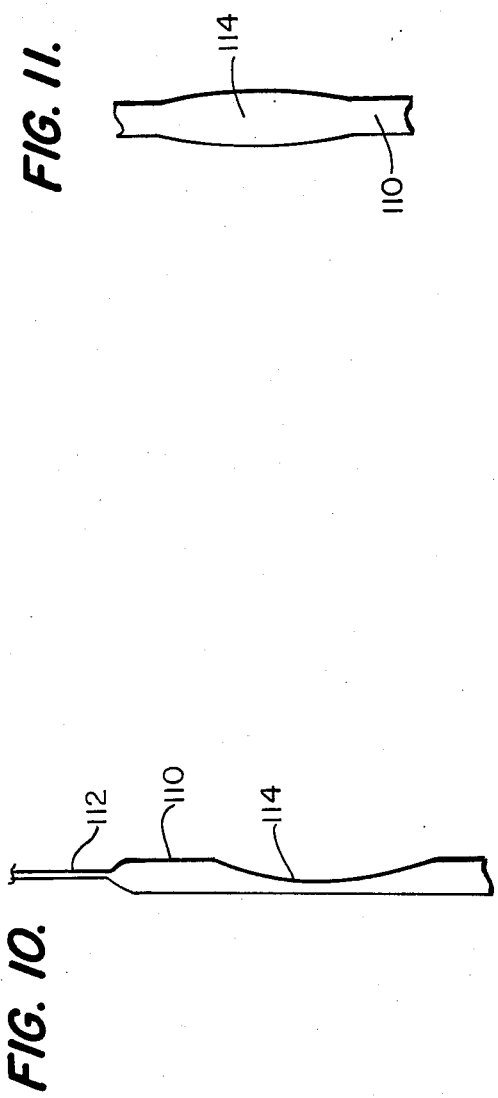

FABRICS MADE OF HOLLOW MONOFILAMENTS

FIELD OF INVENTION

The present invention relates generally to fabrics, and more particularly to fabrics woven of flexible elongated hollow monofilament bristles.

BACKGROUND OF THE INVENTION

In general, all other properties being the same, lightweight fabrics normally provide a number of advantages over heavier fabrics. Thus, lighter fabrics are easier and less expensive to ship and handle than heavy fabrics, and are additionally less expensive because of a lower raw material content. Consequently, the use of lighter weight fabrics results in final products which are less expensive due to a lesser quantity of raw material, and which are easier and less expensive to ship and handle than products produced from heavier fabrics.

A large variety of agricultural fabrics are produced of various sizes and types to serve a large variety of particular needs, such as poultry curtains, shade cloth, ground cover, nursery squares, seed cover, etc. It would be desirable to be able to produce such products having the same degree of coverage, but with a better yield, i.e. a lower weight of product per unit area of coverage. The same is true with regard to fabrics for the home furnishing market, including upholstery fabrics, drapes, outdoor furniture fabrics, etc., where key features include coverage per unit weight of fiber, and flame retardency.

Additionally, many fabric applications require a fabric which, while flexible, will not present any sharp edges which can injure or damage a delicate object resting thereagainst. For example, the packaging of potatoes presents a serious and long existing problem because of the sensitivity and easy abradability of potato skins, especially when freshly picked. Both producer and consumer bags for potatoes, constructed of open mesh synthetic fiber or ribbon fabrics, have been tried unsuccessfully; the fibers of the synthetic fabric tend to cut or abrade the sensitive skin of the potato, this being a particularly serious problem in producer bags used by the farmer before the potato skin has "cured". Consequently, consumer and producer bags for potatoes are conventionally formed of paper or coated paper, which is quite expensive. Some producer bags are formed from jute which is also expensive, and which sometimes cuts the uncured potato skins and sometimes causes rotting of the potatoes. Some consumer potato bags are formed of plastic film with holes cut therein, but these tend to cause undue rotting in spite of the ventilation holes which are cut through the film. Consequently, a great need exists for an improved potato bag, for use at both the producer and consumer levels, which does not cause the aforementioned problems.

While the packing of other types of produce does not present the severity of the problem occasioned by the bagging of potatoes, there is nevertheless a need for an improved general purpose open-mesh produce bag which is sturdy and reliable, does not promote rotting of the produce packaged therewithin, and which is of lighter weight and therefore less expensive than conventional open-mesh produce bags.

Tightly woven synthetic fiber fabric in the form of liner fabric is often used as a curing blanket during the processing of rubber, and this type of fabric is reused as long as it lasts. Its primary function is to support the rubber while offering wrinkle resistance during the curing of the rubber. While one of the necessities of such a curing blanket is that it must offer good release properties of the cured rubber from the fabric, in practice the conventional woven fabrics inevitably have an excess of open spaces into which the raw rubber penetrates, thus causing release characteristics which are not as good as desirable. Consequently, it has been found much more suitable to use flat film rather than liner fabric as a rubber curing blanket even though flat films are not reusable and, consequently, are much more expensive. Therefore, a need exists in the rubber industry for an improved curing blanket which will combine the best properties of flat film and woven liner blankets.

In the carpet industry, most carpet today is made by tufting. Tufted carpet requires a fabric backing through which face yarns are inserted. The tufted carpets normally use a backing fabric made of interwoven fibers of large diameter or of tapes or ribbons (see U.S. Pat. No. 3,110,905) so that the tufted facing yarns may be passed through the large diameters of fibers or ribbons. In automobile and airplane carpets, fabric weight is of especial importance in increasing fuel economy. The backing fabrics should also be flame resistant and are normally required to be made of relatively heavy plastics such as nylons and polyesters because these are more resistant to heat than polyolefins backing fabrics used for conventional tufted carpeting. There is a need in this industry to provide a lighter weight carpet backing, especially for use in the manufacture of automotive and airplane carpeting, which is flame resistant and formed of relatively high melting point, heavy and expensive polymers such as nylons and polyesters.

Filter fabrics normally used today are woven from monofilaments and/or multifilaments and are finished by shrinking methods or calendering to control the equivalent opening size (E.O.S.) or porosity. Shrinking and calendering both require substantial amounts of time and expense. If expensive and time consuming finishing steps such as shrinking and calendering were eliminated or reduced, the production of filter fabrics would be made more efficient and less costly.

It has been pointed out above that fabrics woven of tapes or ribbons are known, e.g. such as for carpet backing for tufted carpets as disclosed in Rhodes U.S. Pat. No. 3,110,905. Mats or the like have also been made from woven ribbons or tapes, noting Kallmann U.S. Pat. No. 2,381,061 Wallach U.S. Pat. No. 1,995,696; Bowser U.S. Pat. No. 1,471,376; Mauran U.S. Pat. No. 562,635 and Stedman U.S. Pat. No. 2,354,435. While these patents show the production of very uniform products, in practice it is exceedingly difficult, if not impossible, to weave ribbons without causing twists, especially for the fill. It is even difficult to make the warp without twist, but it is virtually impossible, due to the inherent nature of the weaving process and especially the removal of the fill yarn from its package during weaving, to make a fabric with an untwisted ribbon fill, short of taking heroic and very time consuming and costly steps.

Conventional fabric of course uses multifilament yarns and sometimes monofilament yarns. Whatever yarns are used, twisting is almost always carried out as a preliminary step in order to provide necessary strength and to prevent the yarns from falling apart. Of course, this constitutes an additional processing step which increases the cost of the final product.

Various types of hollow and semi-hollow synthetic textile fibers have been proposed, such as those mentioned in the patents listed at column 2, lines 24–39 of the Ward et al U.S. Pat. No. 307,478. These are invariably of irregular configuration both radially and from point-to-point along the length thereof. In addition, such synthetic textile fibers are almost always used to form multifilament yarns before being woven into fabric. As a result, the yarns have a tendency to bulkiness, simulating natural fiber yarns as normally desired by the various patentees, but these synthetic yarns are anything but uniform. Also, as mentioned above, the formation of yarns requires a twisting step which adds to the cost.

Relatively uniform hollow brush bristles are also known, e.g. U.S. Pat. Nos. 3,121,040; 3,251,729 and 3,216,033. Insofar as is known, such bristles have never been used for weaving fabric, nor has it been contemplated that fabric woven from such bristles would have any particular use, let along improved properties for certain uses.

SUMMARY OF THE INVENTION

It is, accordingly, an object of the present invention to overcome problems in the prior art, such as mentioned above.

It is another object of the present invention to provide a fabric structure which presents high flexibility, low weight, low abrasion and a wide range of available porosities.

It is still another object of the present invention to provide an improved fabric woven of relatively uniform hollow monofilaments bristles.

It is a further object of the present invention to provide fabric structures woven from elongated hollow monofilament bristles useful as a rubber curing blanket, and for agricultural purposes, carpet backing and filters.

It is still a further object to provide an improved fabric woven of uniform hollow monofilament bristles which, during weaving, become at least partially flattened, and which fabric may optionally be heat set.

It is yet another object of the present invention to provide an improved fabric which is more economical and/or better in physical properties because of (1) an improved yield (less raw material to provide a product of the same properties), (2) a better product on a per weight basis, or (3) a combination of these advantages, the improvement amounting to 40-60%.

It is yet a further object to provide an improved fabric woven of relatively uniform hollow monofilament briatles which requires less processing and is therefore less expensive.

Additional objects include providing a relatively flat fabric wherein the warp and fill do not appear to be twisted; providing a fabric wherein the warp and fill are not pre-twisted; providing a loose weave open mesh fabric for produce bags which will not damage potato skins; providing a tightly woven substantially imperforate flat fabric especially suitable as a rubber curing blanket; and providing a flat filter fabric with good control of the E.O.S without costly additional processing.

These and other objects and the nature and advantages of the present invention will become more apparent upon reading the following detailed description of specific embodiments, taken in conjunction with the following drawings, wherein;

BRIEF DESCRIPTION OF THE DRAWINGS

FIG. 7 is a photomicrograph of a hollow monofilament bristle used in the fabric of the present invention, prior to heat setting, and FIG. 8 is a photomicrograph of the same hollow filament after heat setting, both photomicrographs being at 200×;

FIG. 9 is a partial schematic view of a loose weave fabric according to the present invention for use as a potato;

FIG. 10 is a schematic side view of an elongated hollow monofilament of the potato sacking of FIG. 10, and FIG. 11 is a front elevation view, taken at an angle of 90° from FIG. 10, of the hollow filament of FIG. 10; and FIG. 12 is a schematic view snowing the tufting of backing fabric according to the invention to produce tufted carpeting or the like.

DETAILED DESCRIPTION OF THE PREFERRED EMBODIMENTS

Figure 1:
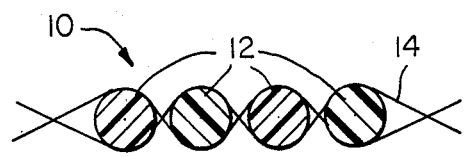
FIG. 1 is a schematic cross section of a prior art fabric formed of solid monofilaments or compressed twisted yarns.

FIG. 1 schematically shows a prior art fabric 10 produced from a compressed yarn or solid interwoven monofilaments as is conventional. Parallel rows 12 of warp yarns are intersected by transversely extending parallel rows 14 of fill yarns, the latter of which are shown schematically. To reduce the porosity of the prior art fabric 10, the transverse fill fibers must be tightly packed and the fabric, after weaving, must be shrunk. The fabric has a given strength which is an inherent function of, among other factors, the plastic from which the fibers are formed and the size of the fibers. The fibers are normally described according to their denier, which is a measure of the weight per unit length. Thus, it is conventional to describe both the degree of fineness of a textile fiber or yarn, and its strength, by setting forth the material and its denier.

Figure 2:
FIG. 2 is a cross section of a hollow monofilament or bristle for use in a fabric according to the present invention.

FIG. 2 shows a cross-section of a flexible elongated hollow monofilament bristle which is used to form the fabrics of the present invention. These hollow bristles 22 must be relatively uniform and are made by extruding through a spinerette die of the type shown and described in Ward et al U.S. Pat. No. 4,307,478, although it will be understood that bristles of the type shown in U.S. Pat. Nos. 3,121,040; 3,251,729 and 3,216,033 can also be used, so long as these are uniform. One of the advantages achieved by the present invention is that for a given fiber size, i.e. comparing the diameters of the conventional monofilaments 12 with the hollow bristles 22, one is able to achieve a much greater yield, i.e. coverage, by using the hollow bristles 22 in the manufacture of fabric, this improvement being on the order of 40–60%; in other words, one can obtain the same coverage as in the prior art using 40–60% lesser material and providing a product which weighs 40–60% less, or one can use the same quantity of raw material and obtain a product having 40–60% greater strength and coverage, or one can obtain a combination to a lesser degree of both of these advantages. Because the bristles are hollow and strong, the weight/strength ratio is lowered in comparison with conventional fabrics.

Figure 3:
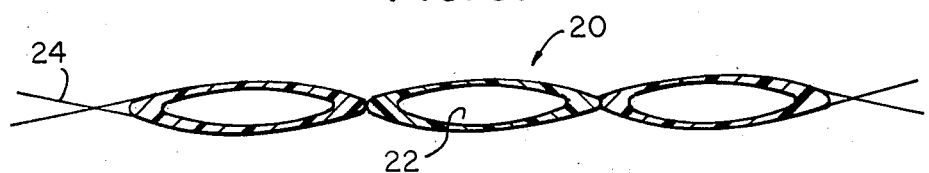
FIG. 3 is a cross section of a hollow monofilament or bristle according to FIG. 2, shown schematically in a fabric according to the invention, and as compressed during weaving.
Figure 4:
FIG. 4 is a schematic cross section of a fabric according to the invention as shown in FIG. 2, which has been further compressed and/or heat set.
Figure 5:
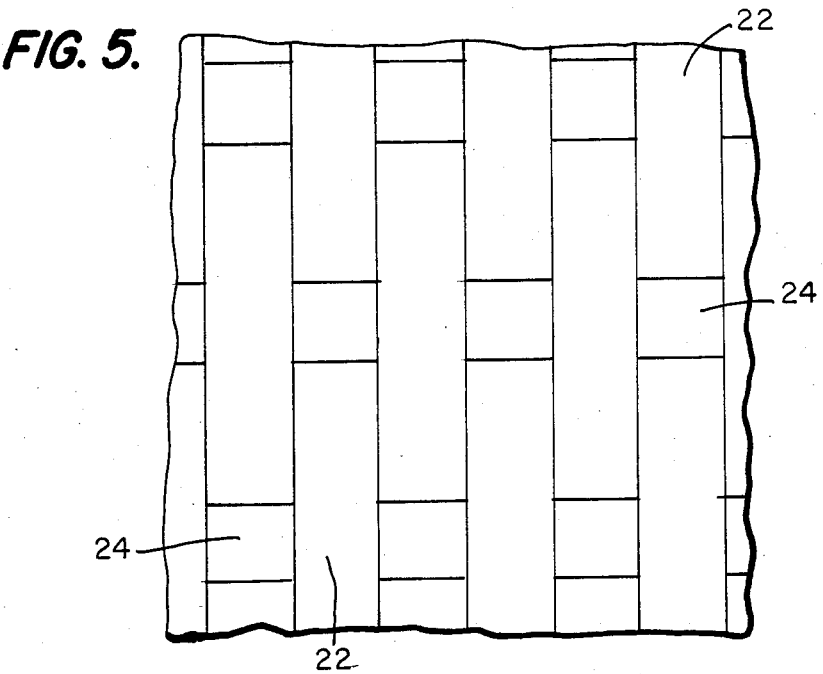
FIG. 5 is a schematic plan view copied from a photomicrograph of a fabric according to the present invention containing 8 mil hollow, non-heat set warp bristles and 12 mil hollow filling bristles, magnification 50×.

FIG. 3 shows, in a schematic way, what happens when the elongated hollow monofilament bristles 22 are used to weave a fabric, the fill monofilaments 24 being represented schematically. During initial weaving, the uniform elongated hollow monofilament bristles 22 become compressed to a certain degree, assuming a more or less ovoid or ellipsoid cross-section as shown in FIG. 3. A plan view copied from a photomicrograph at 50× of such a construction is shown in FIG. 5 wherein the warp bristles 22 are 8 mils in diameter initially, with 8 mil hollow fill bristles 24 being used. It is an important feature of the present invention that during weaving, even though the elongated hollow monofilament bristles may be subjected to a certain degree of twist, there is no folding over as inevitably occurs during the weaving of ribbons or tapes, because the initial flattening does not occur until the bristles 22 and 24 are forced together during the weaving, which is after any initial twisting takes place, such twisting normally occurring during removal of the yarn from the package.

Figure 6:
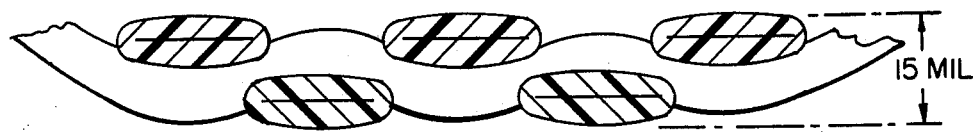
FIG. 6 is a schematic cross-section of a rubber curing blanket according to, the present invention showing both the warp and fill made of flattened hollow elongated monofilament bristles, and wherein the fabric has been flattened.
Figure 6:
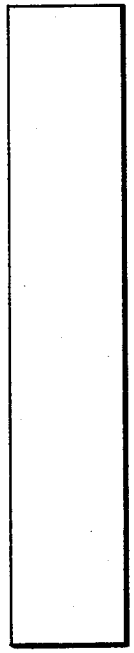
Figure 6:
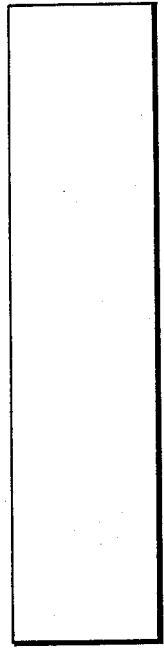
Figure 6:
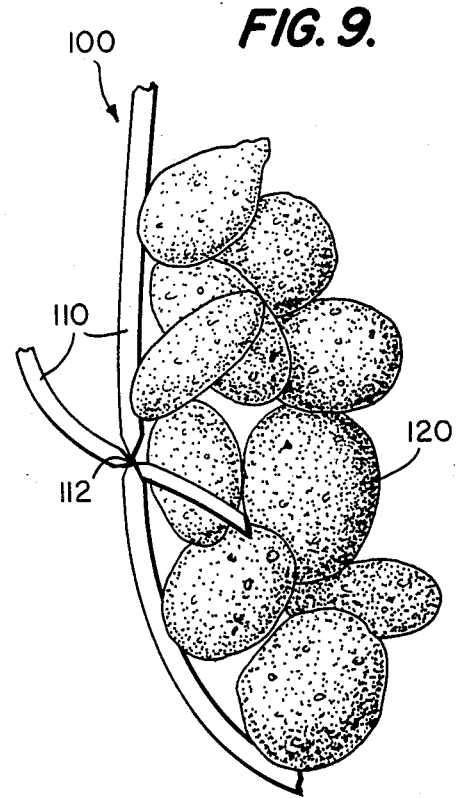

Depending on the purpose of the fabric, it may be desirable to effect further flattening of the elongated hollow monofilament bristles to achieve the configuration shown in FIG. 6. This may be achieved by passing the fabric of FIG. 3 through calender rolls. Preferably, however the fabric need only be heat set which causes some shrinkage and a certain additional degree of flattening of the previously partially flattened bristles, especially at the crossing points; for a tightly woven fabric as shown in FIG. 6, substantially the entire surface area constitutes points at which the warp and filling bristles cross one another, and thus in this type of tightly woven construction, heat setting will effect flattening of substantially the entire fabric. In the case of more open weave fabrics, such as filter fabric or the very open weave for produce bags such as shown in FIG. 10, heat setting will cause collapse, crushing or flattening only at the cross-over point 112.

FIG. 6 shows a fabric in accordance with the present invention which is very tightly woven to completely eliminate any porosity whatsoever, this constructions being particularly designed for use as a rubber curing blanket. Under these circumstances, the fabric, after weaving, is heat shrunk; normally, no further treatment is necessary, although the fabric can be calendered and coated with a suitable filling composition to even further reduce the porosity. The provides an excellent rubber curing blanket which gives good support and is impervious to the uncured rubber. As shown in FIG. 6, this rubber curing blanket may have a total thickness after collapsing of about 15 mils. This fabric has all the desirable properties of a rubber curing blanket, being reusable many times unlike film, but is impervious to the uncured rubber unlike prior woven curing blankets for rubber.

It will be understood that any type of weave may be used, depending on the desired product; in general, the particularly type of weave used is dictated by the intended usage of the resultant fabric. While the illustrated embodiments of FIGS. 5 and 6 show the use of generally uniform elongated hollow monofilament bristles for both the warp and fill, it should be understood that depending on the ultimate use, it is possible to tolerate other types of yarns together with the hollow bristles which characterize the instant invention, e.g. one of the warp or the fill may consist of conventional yarns, or some of the warp and/or fill yarns may be conventional.

FIG. 7 and FIG. 8 compare a heat set and a non-heat set elongated hollow monofilament bristle as used in the fabric of the present invention. It will be seen that after heat setting, noting FIG. 8, the width of the bristle has increased due to the flattening which occurs during such heat setting.

FIG. 9 schematically shows a potato sack 100 formed of an open mesh fabric according to the present invention including warp and fill bristles 110 which cross over at isolated points 112. Potatoes are shown schematically at 120. The weave of such a bag may take the form of 2 or 4 warps placed side-by-side, followed by a gap of about ½ inch. Screen or shade cloth may be formed of a similar weave.

With reference to FIGS. 10 and 11, it will be seen that in areas where the potatoes come to rest against the elongated bristles 110, the bristle will collapse and spread out as shown at 114. Thus, the hollow nature of the bristles may also act as a cushion which can collapse to accommodate a potato or other item of produce pressing thereagainst. It will therefore be understood that the present invention provides a fabric which is very adaptable, e.g. its adaptability permits the hollow bristle to adapt to the shape of whatever item rests thereagainst as shown in FIGS. 9–11, without producing sharp edges that might damage the produce or any other sensitive material carried therein. For this reason, the fabric in question is ideally suited to bags, containers or packaging material for products or articles having delicate and easily damaged surfaces.

As shown in FIG. 12, the flattening from the hollow bristles 200 in the backing fabric illustrated increases the ease of tufting by presenting a larger surface through which the tufting needle 210 of a tufting machine 220 may insert tufts 222. The fabric in FIG. 12 is moving from left to right and the untufted portion is shown to the left at 224, where it is seen that it is less flattened prior to tufting. Flattening during compression such as during tufting of a backing fabric as shown in FIG. 12, further decreases the space between adjacent bristles, and this further facilitates efficient tufting.

The elongated hollow monofilament bristles used to make fabrics according to the present invention may be formed of any conventional thermoplastic material, such as polyesters, polyolefins including polyethylene and polypropylene, polyacrylics, polyamides and even Saran. Where cost of raw material is important such as in the manufacture of produce bags, then the bristles are preferably formed of low cost thermoplastics such as polyethylene and polyolefins. On the other hand, where certain properties are needed such as heat resistance in the manufacture of automotive and airplane carpeting, the bristles will be formed of polyester, polyamide or even Saran, the latter of which is extremely flame resistant.

Fabrics according to the present invention have many advantages, as pointed out above. They have a superior weight/strength ratio and consequently provide a better yield and/or a better product on a per weight basis. The fabrics become flattened without twists and bends as inevitably occurs when weaving ribbon yarns. In addition, depending on the particular type of fabric being produced, processing steps may be eliminated such as pre-twisting or post treatments including calendering and coating.

The foregoing description of specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments. It is to be understood that the phraseology or terminology employed herein is for purposes of description and not of limitation.

What is claimed is:

1. In a woven fabric comprising warp yarns running longitudinally and fill yarns running transversely, the improvement wherein at least some of said yarns consist of flexible generally uniform elongated hollow monofilament bristles formed of synthetic plastic, and which are at least partially compressed during weaving to provide an at least partially flattened, substantially untwisted bristle cross-section.

2. A woven fabric according to claim 1 wherein substantially all said warp yarns and said fill yarns consist of said generally uniform elongated hollow monofilament bristles.

3. A woven fabric according to claim 2 which has been heat-set.

4. A woven fabric according to claim 2 wherein said yarns have been substantially flattened.

5. A woven fabric according to claim 2 comprising open mesh cloth for produce bags.

6. A woven fabric according to claim 3 comprising a tightly closed mesh cloth for rubber curing blankets.

7. A woven fabric according to claim 4 comprising a tufted carpet backing.

8. A woven fabric according to claim 7 wherein said synthetic plastic is polyester, polyamide or Saran; said fabric is closed mesh and heat-set; said yarns are substantially flattened; and said fabric is for automotive or airplane carpet backing.

9. A woven fabric according to claim 2 comprising filter cloth.

10. A woven fabric according to claim 2 comprising open-mesh agricultural fabric.

11. A woven fabric according to claim 2 comprising home furnishing fabric.

* * * * *